United States Patent
Jones

(10) Patent No.: US 9,563,338 B2
(45) Date of Patent: Feb. 7, 2017

(54) DATA VISUALIZATION INTERFACE

(71) Applicant: OpDots, Inc., Austin, TX (US)

(72) Inventor: Robert F. Jones, Austin, TX (US)

(73) Assignee: OpDots, Inc., Bee Caves, TX (US)

(*) Notice: Subject to any disclaimer, the term of this patent is extended or adjusted under 35 U.S.C. 154(b) by 497 days.

(21) Appl. No.: 14/046,427

(22) Filed: Oct. 4, 2013

(65) Prior Publication Data

US 2014/0040794 A1 Feb. 6, 2014

Related U.S. Application Data

(63) Continuation of application No. 13/355,248, filed on Jan. 20, 2012, now Pat. No. 8,615,511.

(60) Provisional application No. 61/461,682, filed on Jan. 22, 2011.

(51) Int. Cl.
| | | |
|---|---|---|
| G06F 17/30 | (2006.01) | |
| G06F 3/0484 | (2013.01) | |
| G06F 9/44 | (2006.01) | |

(52) U.S. Cl.
CPC ....... G06F 3/0484 (2013.01); G06F 17/30572 (2013.01); G06F 17/30864 (2013.01); G06F 17/30867 (2013.01); *G06F 9/4443* (2013.01)

(58) Field of Classification Search
CPC .................... G06F 17/30554; G06F 17/30572; G06F 3/0484
USPC .......................... 707/722; 345/440; 715/763
See application file for complete search history.

(56) References Cited

U.S. PATENT DOCUMENTS

| | | | | |
|---|---|---|---|---|
| 6,529,900 B1* | 3/2003 | Patterson | .......... | G06F 17/30554 707/769 |
| 6,711,577 B1* | 3/2004 | Wong | ................ | G06F 17/30572 345/419 |
| 7,800,613 B2* | 9/2010 | Hanrahan | .......... | G06F 17/30554 345/440 |
| 8,108,766 B2* | 1/2012 | Meunier | ................ | G06F 17/217 715/236 |
| 8,156,131 B2* | 4/2012 | Marsden | ................ | G06Q 50/02 707/722 |
| 8,185,563 B2* | 5/2012 | Cohen | ................ | G06F 17/30392 707/805 |
| 8,392,358 B2* | 3/2013 | Dampier | ........... | G06F 17/30551 705/7.42 |
| 8,615,511 B2* | 12/2013 | Jones | ................ | G06F 17/30572 707/713 |

(Continued)

*Primary Examiner* — Shahid Alam
(74) *Attorney, Agent, or Firm* — Pillsbury Winthrop Shaw Pittman LLP

(57) ABSTRACT

Provided is a method of preparing a data-visualization interface. The method may include receiving a request to view data; retrieving a display configuration responsive to the request to view data, the display configuration identifying two or more context dimensions and three or more sub-display dimensions; retrieving data responsive to the request to view data; designating, in visualization data, a portion of the data as visible data and a portion of the data as cache data based on the display configuration; assigning, in the visualization data, positioning data to a plurality of sub-displays based on the two or more context dimensions, the sub-displays displaying data markers; assigning, in the visualization data, a portion of the cache data to groups of the sub-displays that are co-linear based on the context dimensions; and transmitting the visualization data.

11 Claims, 15 Drawing Sheets

(56) References Cited

U.S. PATENT DOCUMENTS

| | | | | |
|---|---|---|---|---|
| 2003/0097640 | A1* | 5/2003 | Abrams | G06F 17/241 |
| | | | | 715/255 |
| 2004/0181519 | A1* | 9/2004 | Anwar | G06F 17/30592 |
| | | | | 707/769 |
| 2007/0076001 | A1* | 4/2007 | Brand | G06K 9/6232 |
| | | | | 345/440 |
| 2007/0208725 | A1* | 9/2007 | Gilger | G06F 17/30017 |
| | | | | 707/713 |
| 2008/0040372 | A1* | 2/2008 | Bissantz | G06F 17/245 |
| | | | | 707/804 |
| 2010/0121847 | A1* | 5/2010 | Olston | G06F 17/30646 |
| | | | | 707/736 |
| 2010/0174975 | A1* | 7/2010 | Mansfield | G06F 17/211 |
| | | | | 715/227 |
| 2011/0074786 | A1* | 3/2011 | Aggarwal | G06F 17/30572 |
| | | | | 345/440 |
| 2012/0191704 | A1* | 7/2012 | Jones | G06F 3/0484 |
| | | | | 707/722 |

* cited by examiner

External Data System 128

Details
Opportunity Network services
Account Acme
Deal Size $12,500
Stage Contract Negotiation
Created Date 12-09-2010
Target Close 1-15-2011

Status 126
Expansions | Renewals | New Customers | Support Cases

Related Information

| Opportunity | Account | Deal Size | Target Close |
|---|---|---|---|
| Network services | Acme | $12,500 | 1-15-2011 |
| IT overhaul | Barber | $8,300 | 1-25-2011 |
| SW Assessment | Doyle | $22,000 | 1-11-2011 |

Fig. 10

DATA VISUALIZATION INTERFACE

CROSS-REFERENCE TO RELATED APPLICATIONS

The present application is a continuation of U.S. patent application Ser. 13/355,248 filed Jan. 20, 2012, which claims the benefit of U.S. Provisional Application 61/461,682, filed Jan. 22, 2011, each of which are incorporated by reference in their entirety for all purposes.

BACKGROUND OF THE INVENTION

1. Field of the Invention

The present invention relates generally to a system and tools for data visualization and, more specifically, to a system and tools for generating a data visualization interface.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As businesses have become increasing reliant upon information technology as their employees, customers, and vendors generate large and increasing amounts of data during business operations. The data may include items such as data entered in a database by employees regarding customer relationships or sales leads, data entered by customers regarding new orders or feedback on previous transactions, or data entered by vendors regarding orders placed by the company. The data may also include manufacturing data, such as inventory numbers, pricing, quality-control data, equipment data logs, and data tracking work in progress.

Further, some data may reflect potentially complex inter-relationships between other portions of the data. For example, a serial number may be related in a database to vendor data, inventory data, customer order data, sales lead data, and customer feedback data. Similarly, for example, data identifying an employee may be related to data generated in the course of work for which that employee is responsible.

Other types of data generated in various businesses include real-estate data, intellectual-property portfolio data, data regarding portfolios of assets generally, data regarding commercial property asset management, financial data, e.g., mortgages, accounts receivable, accounts payable, etc. These are just a few examples that illustrate the volume and complexity of data stored in many companies' databases.

The data often relates to the ongoing operation of the business, and analyzing the data in a timely fashion may allow business managers to make better business decisions. Frequently, however, the amount of data and complexity of relationships between various fields of data impedes efforts by those managing a business to quickly understand the significance of the data to their business. To this end, some businesses employ specialized data analysts or consultants whose sole function is querying databases and generating reports, for example using Microsoft Excel from Microsoft Corp. of Redmond, Wash. These reports are typically tedious to generate, offer relatively limited understanding of the data, and in the event that the reports inspire additional lines of inquiry by their audience, another round of querying and reports is often required, thereby slowing the process of investigating the data.

More sophisticated tools for analyzing business data than Excel exist, but these tools are often difficult to operate and are often implemented by employees or consultants with higher levels of training and greater labor costs than those limited to use of Excel. The more sophisticated tools often include a more detailed view of the data that can include additional dimensions of the data displayed simultaneously or accessible through user interaction with an analysis of the data, but users often experience difficulties when selecting among a potentially large number of fields in a database to represent visually, e.g., in a graph or other form of data visualization, particularly when selecting which fields should be displayed on, or mapped to, which visual aspects of a data visualization to convey information precisely and with concision.

BRIEF DESCRIPTION OF THE DRAWINGS

The above-mentioned aspects and other aspects of the present techniques will be better understood when the present application is read in view of the following figures in which like numbers indicate similar or identical elements:

FIG. 2 illustrates an example of a data-visualization interface created by the system of FIG. 1;

FIGS. 3-8 illustrate interactive aspects of the data-visualization interface of FIG. 2;

FIG. 9 illustrates another example of a data-visualization interface having three context dimensions;

FIG. 10 illustrates an example of an embedded data visualization interface;

Figure 1:
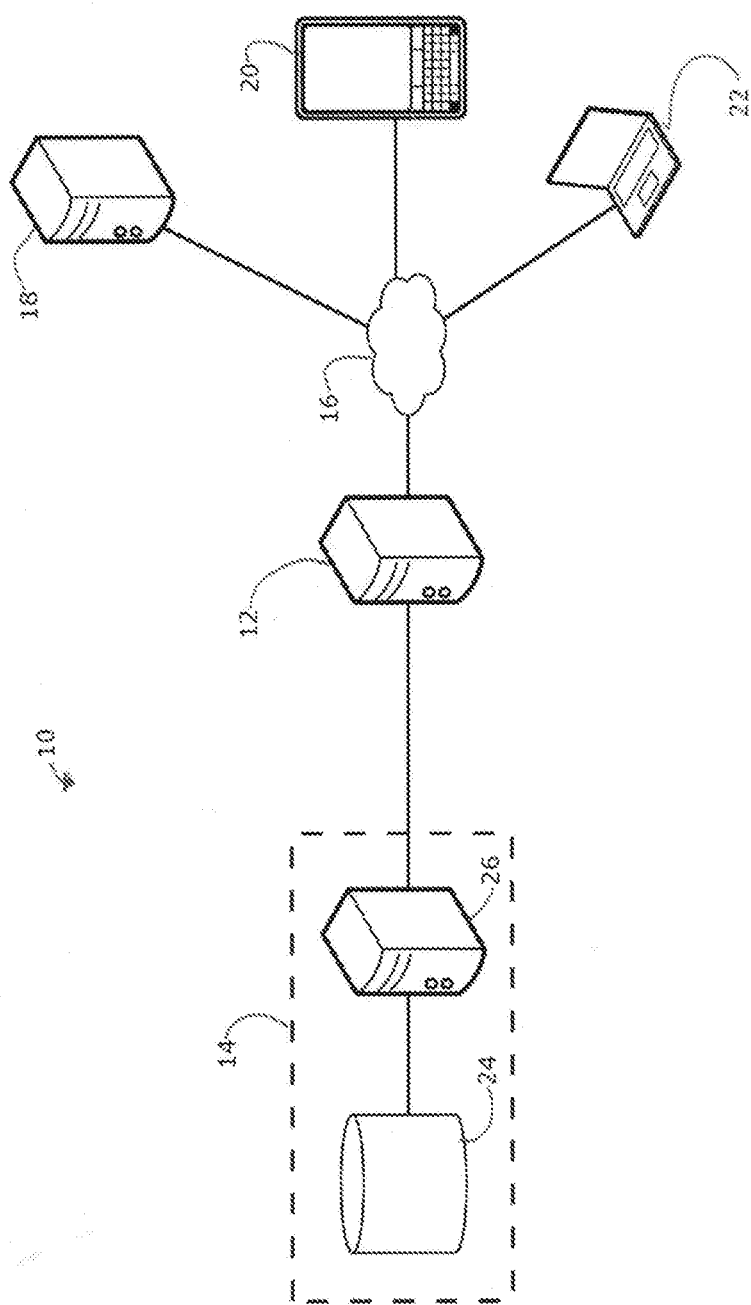
FIG. 1 illustrates an example of a system for visualizing data.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming but would nevertheless be a routine undertaking of design, implementation, and manufacture for those of ordinary skill having the benefit of this disclosure.

FIG. 1 illustrates an example of a system for visualizing data 10. The system 10 may include a visualization server 12 connected to a data source 14 and receiving devices 18, 20, and 22 via the network 16. As explained in greater detail below, the visualization server 12 may be configured to request data from the data source 14, construct a data-visualization interface using the requested data, and transmit the data-visualization interface to the receiving devices 18, 20, and 22.

The transmitted data-visualization interface may include relatively high dimensional data visualizations, e.g., the visualization server 12 may transmit data visualizations with more than four dimensions of data, more than five dimensions of data, more than six dimensions of data, more than seven dimensions of data, or more than eight dimensions of data. Further, as explained in greater detail below, the data-visualization interface may include interactive features and may cache data on the receiving devices 18, 20, and 22 for use in responding to user interaction. In some embodiments explained below, the cache data is not initially displayed as part of the data visualization, but is stored locally on the receiving devices 18, 20, and 22 for responding to user interaction with the data visualization with relatively low latency, e.g., relative to the time the system 10 would take to respond to user interaction with the data-visualization interface by requesting additional data from the data source 14. Additionally, in some embodiments, the visualization server 12, as explained further below with reference to FIGS. 13 and 14, may be configured to generate a visualization-configuration interface that assists a user seeking to configure a data visualization by pre-populating menu options with data fields from the data source 14 that are likely to be appropriate for mapping to various aspects of the data-visualization interface being configured, thereby potentially reducing the amount of skill and effort that is often used when configuring a relatively high dimensional data visualization interface.

The visualization server 12 may be implemented in various forms. For example, the visualization server 12 may be implemented in a rack server or a standalone tower. The visualization server 12 may be implemented as a virtual server or in hardware form.

The visualization server 12 may include code that is, or may itself be, recorded on a tangible machine-readable medium storing: 1) instructions for forming data visualization interfaces, such as those discussed with reference to FIGS. 2 through 11 below; 2) instructions for performing a method for forming these data visualizations, such as the method discussed below with reference to FIG. 12; 3) instructions for forming and receiving selections from a visualization configuration interface, such as the visualization-configuration interface of FIG. 13 discussed below; and 4) instructions for performing a method of populating menu options in the visualization configuration interface, such as the method of FIG. 14 described below.

The data source 14 may include a database 24 and a server 26. The database 24 may be a structured database, such as a relational database, a graph database, or a flat file. Or, in some embodiments, the database 24 may be an unstructured database. The server 26 may be configured to receive requests for data, e.g., from the visualization server 12, read the requested data from the database 24, and return the requested data to the visualization server 12. The server 26 may also be configured to receive and process requests for metadata, such as table names, field names, data types, and the statistics about the data in the database 24, such as the cardinality of a field. In some embodiments, the data source 14 may receive requests from the visualization server 12 and send data to the visualization server 12 via a network, such as the Internet.

Network 16 may be include any of a variety of different types of networks, in combination or individually, such as the Internet, an intranet (wired or wireless), a cellular network, and a telephone network. Network 16 may carry requests for data visualization from receiving devices 18, 20, and 22 to the visualization server 12 and may carry data visualizations prompted by the requests from the visualization server 12 to the receiving devices 18, 20, and 22.

The receiving devices 18, 20, and 22 are shown as an example of a Web server 18, an example of a smart phone 20, and an example of a personal computer 22. In some embodiments, all of the receiving devices may fall within one of these categories, or the receiving devices may include a variety of different types of receiving devices configured to connect to the visualization server 12. In some embodiments, the receiving devices 18, 20, and 22 may include a World Wide Web browser for depicting data visualization interfaces, presenting visualization configuration interfaces, and receiving and transmitting user interaction. While only three receiving devices 18, 20, and 22 are shown, visualization server 12 is not limited to only three receiving devices, and in some embodiments, may transmit data visualizations to substantially more receiving devices. As explained below with reference to FIG. 10, Web server 18 may be configured to receive a data-visualization interface from visualization server 12 and embed that data visualization in a webpage having additional information and context.

Figure 2:
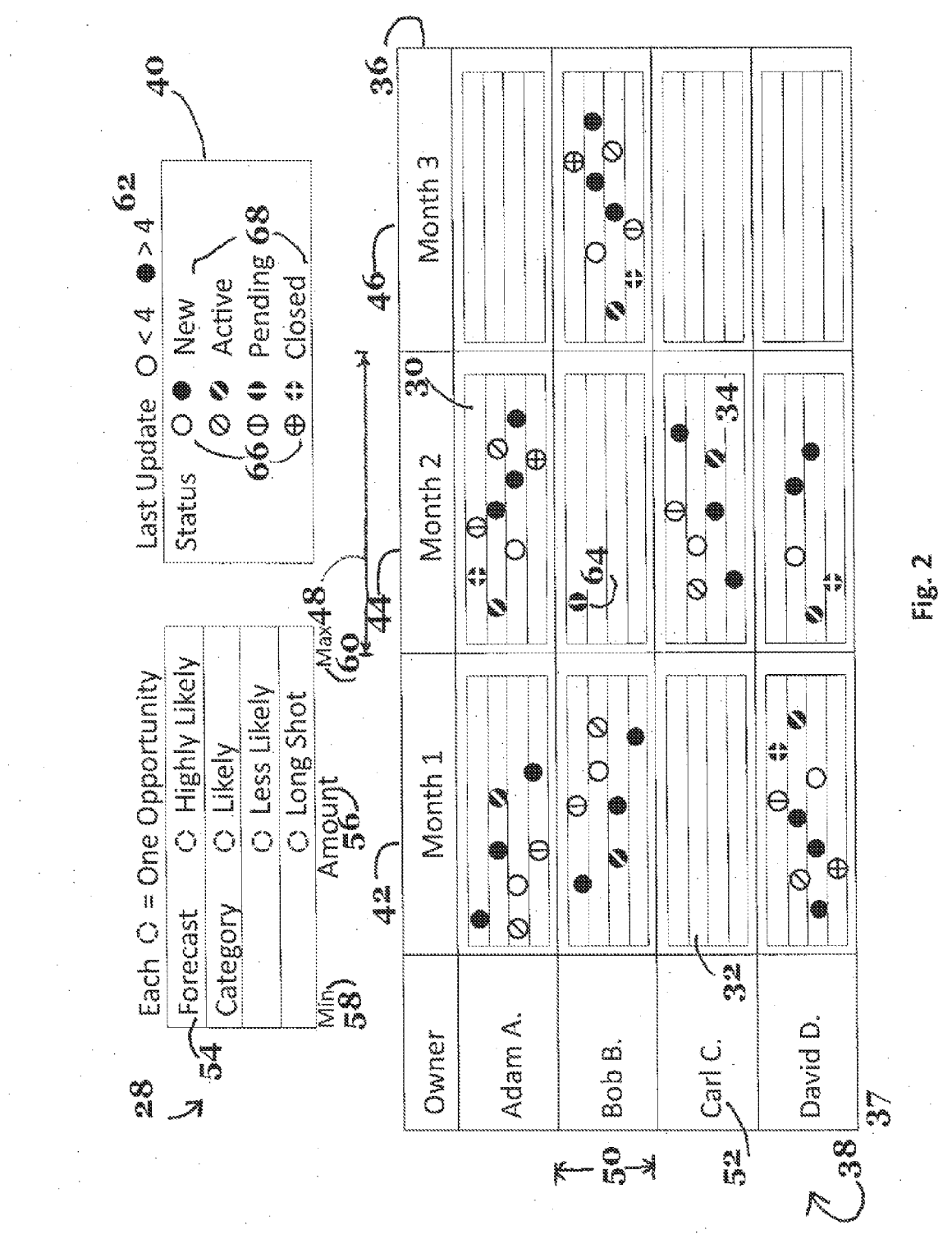

FIG. 2 illustrates an example of a data-visualization interface 28. The data-visualization interface 28 may be formed by the visualization server 12 of FIG. 1 based on data from the data source 14 and presented by a browser executing on one of the receiving devices 18, 20, and 22. As shown in FIG. 2, the data-visualization interface 28 may include a plurality of sub-displays 30, 32, and 34 arranged according to context dimensions 36 and 38. In this embodiment, the illustrated sub-display 30, 32, and 34 are each Cartesian graphs, and the illustrated context dimensions 36 and 38 are orthogonal coordinates that indicate the context of the data visualized in the sub-displays, e.g., the data visualized in the sub-display at a given coordinate of the context dimensions 36 and 38 is related to the given coordinate values of the context dimensions 36 and 38, e.g., by residing in the same row of a table or by being linked by key values in different tables in the database 24 of FIG. 1. The data-visualization interface 28 may also include a sub-display legend 40, described in more detail below, for interpreting the sub-displays 30, 32, and 34.

In this embodiment, the context dimensions 36 and 38 are mapped to orthogonal spatial dimensions of the data-visualization interface 28. In the embodiment of FIG. 2, the context dimension 36 is mapped to a horizontal distance across the data-visualization interface 28, and the context dimension 38 is mapped to a vertical distance across the data-visualization interface 28. Further, the illustrated context dimensions 36 and 38 are nominal values (e.g., category names) or discrete units (e.g., integers) and are mapped to discrete distances. For example, in this embodiment, each unit of distance in the horizontal context dimensions 36 has an integer value that increases by one and is mapped to approximately the same width, such that each of the columns 42, 44, and 46 have approximately the same width 48. Similarly, the vertical context dimension 38 reflects nominal values, each corresponding to the name of an individual, and mapped to approximately a discrete unit of distance that is the width of one row 50. The illustrated embodiment has three columns 42, 44, and 46, but other embodiments may have more or fewer columns and more or fewer rows of sub-displays than are depicted in FIG. 2. Further, the sub-displays are shown with a particular aspect ratio, but other embodiments may include sub-displays with other aspect rations, e.g., square sub-displays or sub-displays that are taller than they are wide.

Other embodiments may include additional context dimensions that correspond to the position of the sub-displays 30, 32, and 34. For example, a data visualization may include a third spatial dimension with an additional context dimension mapped to a vector normal to the context dimensions 36 and 38, e.g., the sub-displays 30, 32, and 34 by appear out of, or into, the page of FIG. 2 through the use of a 3D display or techniques to simulate distance, such as shadows and perspective transforms applied to the sub-displays 30, 32, and 34. Additionally, context dimensions may be mapped to features of the sub-displays 30, 32, and 34 other than the position of the sub-displays within the data-visualization interface 28. For example, the context dimensions may be mapped to a transparency, color scheme, or shadow of the sub-displays 30, 32, and 34. Further, in other embodiments, the context dimensions 36 and 38 may not be orthogonal, for example, they may be mapped to polar coordinates, such as described below with reference to FIG. 11, and in some embodiments, the context dimensions are not mapped to discrete units of space, for example, the sub-displays 30, 32, and 34 are not necessarily in a rectangular matrix.

Sub-displays having the same value for one or more context dimensions 36 and 38 are said to be "co-linear," and the sub-displays can be co-linear even if the context dimensions for which they have the same value is not mapped to a spatial distance within the data-visualization interface 28, e.g., sub-displays having the same degree of transparency, where transparency is a context dimensions of sub-displays, are co-linear. In the illustrated example, the sub-displays 30 and 34 are co-linear for the value 2 in the context dimensions 36, and of the sub-displays 32 and 34 are co-linear in the context dimension 38 for the listed person's name.

Thus, the coordinates for the context dimensions 36 and 38 may correspond to the information in the sub-displays 30, 32, and 34 that are co-linear along those coordinate values for each context dimensions 36 and 38. For example, the information presented in sub-displays 32 and 34 may relate to the individual listed in context dimensions value 52 in context dimensions 38. Thus, in the illustrated embodiment, each sub-display 30, 32, and 34 depicts a graphical representation of information about a combination of two orthogonal context dimensions coordinates. In the pictured embodiment, context dimensions 36 corresponds to each of the previous three months, and context dimension 38 corresponds to the names of salespersons. Thus, in the present embodiment, data-visualization interface 28 presents a sub-display 30, 32, and 34 for each salesperson in context dimensions 38 for each of the last three months in context dimensions 36.

In the embodiment of FIG. 2, legend 40 explains which dimensions are mapped to which attributes of the sub-displays 30, 32, and 34. The vertical axis attribute, or ordinate, of the sub-displays is mapped to a forecast category dimension 54, as shown by legend 40, and the horizontal axis attribute, or abscissa, is mapped to a dimension referred to as the amount 56. The dimension with fewer potential unique values, that is, the dimension with the lower cardinality, in the illustrated embodiment is mapped to the vertical axis attribute of the sub-displays 30, 32, and 34, as shown by legend 40, and the dimension with a higher cardinality, amount 56, which in this embodiment could assume any unit of measurement between a minimum 58 and a maximum 60, is mapped to the horizontal axis attribute as shown in legend 40. More generally, in some embodiments, dimensions are mapped to the sub-displays 30, 32, and 34 according to the cardinality of the dimension and resolution of the attribute, e.g., horizontal position, vertical position, color, transparency, shadowing, shape, etc. In the pictured embodiment, the horizontal axis attribute mapped to amount 56 is longer than the vertical axis attribute mapped to forecast category 54. Accordingly, in this embodiment, the higher cardinality dimensions is mapped to the longer axis, which in this embodiment has a higher resolution, or capacity to depict are larger number of different data values, due to the larger number of potential positions along the horizontal axis than along the vertical axis.

Similarly, in the illustrated embodiment, lower cardinality values than those of dimension 56 are mapped to the context dimensions 36 and 38. Each value of context dimensions 36 assumes one of three values, for each of the last three months, and each value of context dimensions 38 assumes one of a finite number of values for each of the names listed.

As explained below with reference to FIGS. 13 and 14, a method is described in FIG. 14 that assists a user configuring data-visualization interface 28 in selecting which dimension is mapped to which data visualization attribute (e.g., spatial location, three-dimensional depth, shadow, color, shape, transparency) according to the resolution of that attribute in the data-visualization interface 28 and the cardinality of the data being visualized, or mapped to the attribute.

Further, in some embodiments, the min value 58 and the max value 60 may be selected by the visualization server 12 (shown in FIG. 1) based on the range of data appearing in the sub-display 30, 32, or 34. For instance, the visualization server 12 may calculate a min value and a max value based on an average and standard deviation of the data mapped to the horizontal axis attribute and set the min and max value at some multiple, e.g., 2 or 3, of the standard deviation plus or minus, respectively, the average value of that data. In some embodiments, outliers beyond the min and the max may be represented in a border region, e.g., against a left or right side, of the sub-displays.

In the depicted embodiment, sub-displays 30, 32, and 34 include a plurality of data markers 64 positioned within the sub-displays according to their data values mapped to the horizontal and vertical axes of the sub-displays. Legend 40 may also include a shape legend 62 indicating that the shape of data markers is mapped to a dimension, and the illustrated case, a dimension indicating whether the item identified by the data marker was modified more or less than four days ago. Finally, legend 40 includes a list of data marker colors and labels identifying which data marker color 66 is mapped to which dimension value 68.

Thus, as indicated by legend 40, each sub-display 30, 32, and 34 includes four attributes: the horizontal axis mapped to attribute 56, the vertical axis mapped to attribute 54, the shape of data markers 62, and the correspondence between color 66 and dimension value 68. Other embodiments may include additional attributes mapped to additional dimensions. For example, data marker size, transparency, background color, and shadow. In some embodiments, the data markers 64 may be animated, for example with an animated GIF (graphic-interchange format image), and movement, for example frequency of vertical or horizontal oscillation, may be mapped to a dimension. For instance, data markers 64 may vibrate if a threshold is exceeded for the dimension to which movement is mapped.

Data-visualization interface 28 may be encoded in a variety of formats, including hypertext markup language ("HTML"), and the data-visualization interface 28 may be transmitted as an data visualization file that includes both HTML code, scripting language code (e.g., JavaScript), and associated image files. The present technique is not limited to HTML and JavaScript, however, and a data visualization file may be encoded in other formats, e.g., as a graphical user interface in a stand-alone application executing on a personal computer.

In some embodiments, cache data (defined below) may be used to expedite interactions between a user and the data-visualization interface 28. Data-visualization interface 28 may be transmitted by the visualization server 12 (shown in FIG. 1) with more data than is visible in the initial presentation of data-visualization interface 28. FIG. 2 is an example of the initial presentation of the data-visualization interface, which depicts the data visualization as it appears prior to any user interaction. By interacting with the data-visualization interface 28, a user may reveal additional, otherwise not displayed data.

In some embodiments, this additional data, called "cache data," is transmitted by the visualization server 12 (shown in FIG. 1) prior to, or without waiting for, user interaction with the data-visualization interface 28, and the additional data may be stored in memory on the receiving device 18, 20, or 22 (shown in FIG. 1) for use in the event that a particular user interaction occurs. The term "cache data" is used herein to refer to data that is 1) stored on the receiving device 2) but is not initially displayed in the data-visualization interface 28 prior to user interaction requesting the data and 3) that is transmitted by visualization server 12 (shown in FIG. 1) without waiting for user interaction to request the additional data. In some embodiments, cache data is transmitted by the visualization server 12 in response to a request for data-visualization interface 28 and, then, the cache data is stored in receiving device 18, 20, or 22. Storing cache data is believed to facilitate relatively low latency access to the cache data when a user interacts with data-visualization interface 28. Storing the cache data locally is believed to expedite the response of the data-visualization interface 28 to a user request for additional data relative to systems in which the cached data is stored remotely, e.g., in data source 14.

Figure 3:
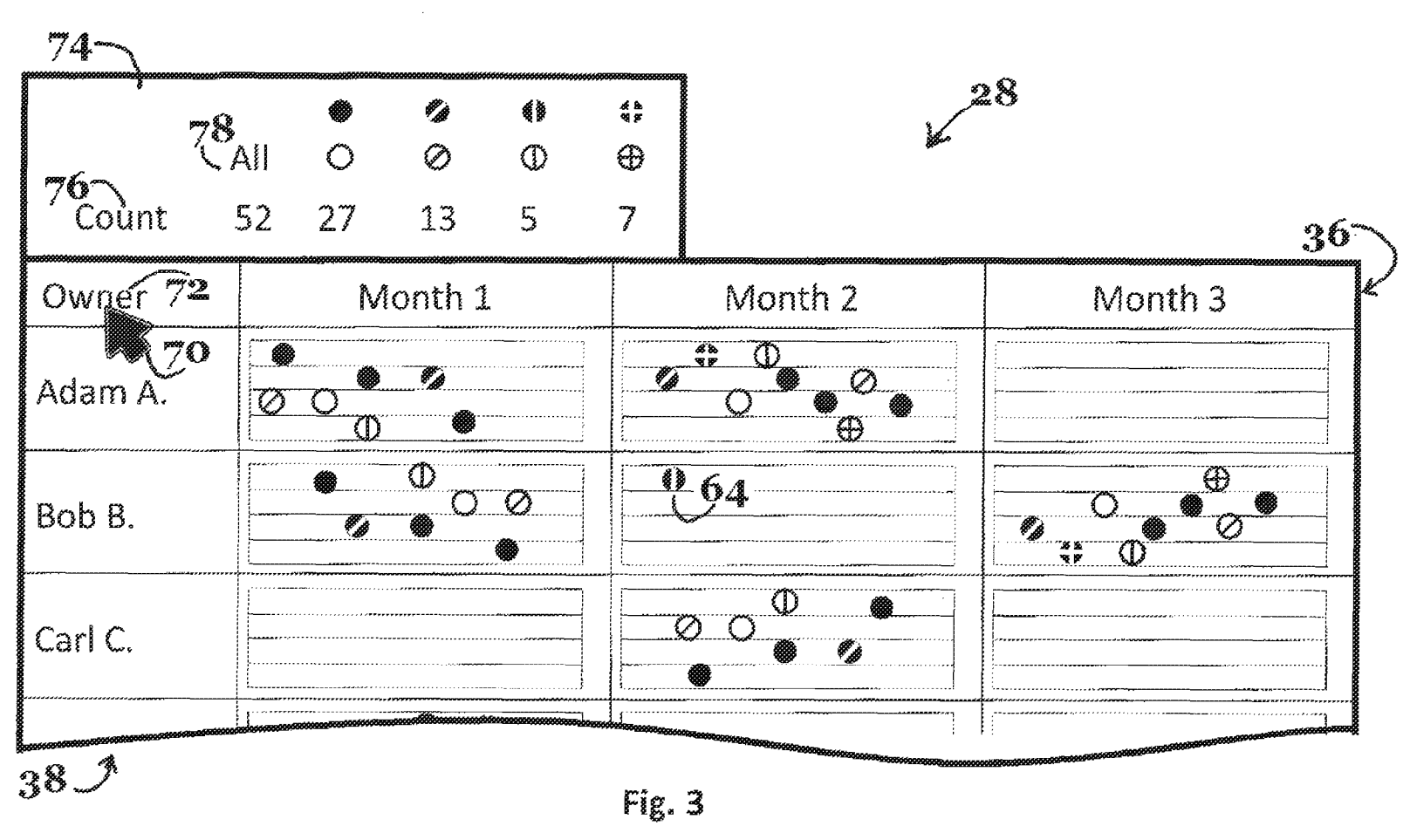

In some embodiments, cached data is displayed by a user interacting with the data-visualization interface 28 to indicate which cache data is desired by the user. FIGS. 3-10 illustrate interactive aspects of the data-visualization interface 28 of FIG. 2. In some embodiments, the illustrated interaction may be encoded in JavaScript transmitted with the visualization file encoding the data-visualization interface 28. FIG. 3 illustrates an example of a response of the data-visualization interface 28 to a cursor 70 hovering over a label 72 for the context dimensions 38. As illustrated by FIG. 3, in some embodiments, the label 72 lies at the intersection of the labels for the context dimensions 36 and 38. In this embodiment, the data-visualization interface 28 responds to the cursor 70 hovering over label 72 for more than some threshold time, for example more than 2 seconds, by creating a summary display 74 containing statistics 76 about the data markers 64 contained within the entire data-visualization interface 28. In the embodiment illustrated in FIG. 3, the statistics 76 are counts of each data marker 64 having one of the data marker colors 66 shown in legend 40. Statistics 76 also include a count 78 of all data markers 64. In other embodiments, the summary display 74 may include other statistics, such as the median, the mean, the standard deviation, the variance, the max, or the min. In some embodiments, the statistics 76 may be stored as cache data or the statistics 76 may be calculated by the receiving device 18, 20, or 22 (FIG. 1) in response to the cursor 70 hovering over label 72, for example as specified in JavaScript transmitted as part of the visualization file by the visualization server 12 (FIG. 1).

Figure 4:
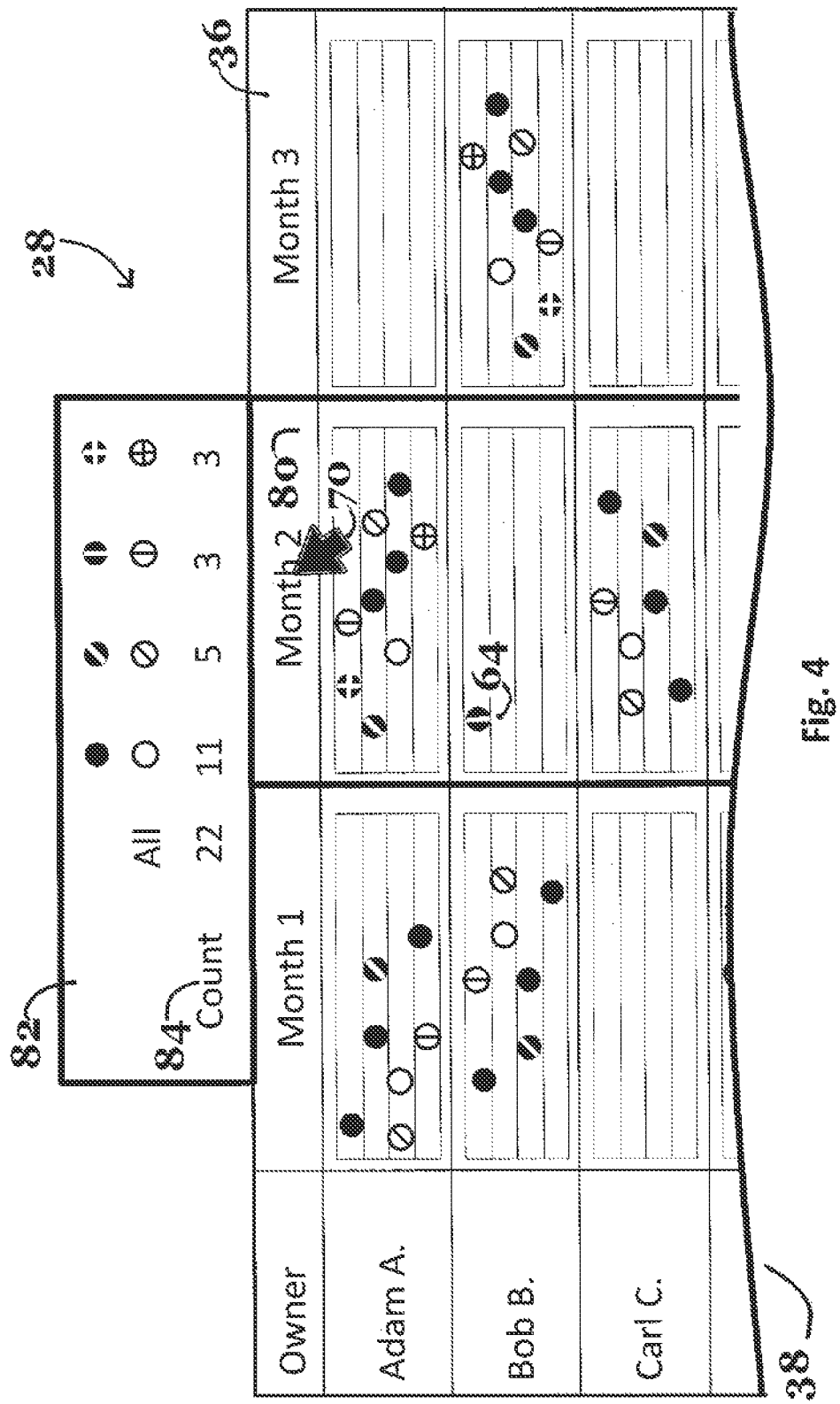

FIG. 4 illustrates another form of interaction between a user and the data-visualization interface 28. FIG. 4 illustrates a response of the presently described embodiment of a data-visualization interface 28 to a user hovering the cursor 70 over label 80 for the context dimensions 36. In the form of interaction pictured in FIG. 4, the data-visualization interface 28 creates a summary display 82 having statistics 84 about the data markers 64 that are co-linear (e.g., in the same column) along the value specified by label 80 of context dimensions 36. In the pictured embodiment, the statistics 84 are counts for each data marker color for each data marker in the sub-displays 30 in the column pictured in part in FIG. 4. The statistics 84 may be stored as cache data or may be calculated in response to the cursor 70 hovering over label 80, e.g., according to JavaScript transmitted with a visualization file encoding the data-visualization interface 28, and other statistics, such as those mentioned above with reference to summary display 74 of FIG. 3 are contemplated. The data-visualization interface 28 may be configured to create a similar summary display 82 in response to the cursor 70 hovering over any label in dimension 36 reflecting statistics about sub-displays 30 that are co-linear to that value of dimension 36.

Figure 5:
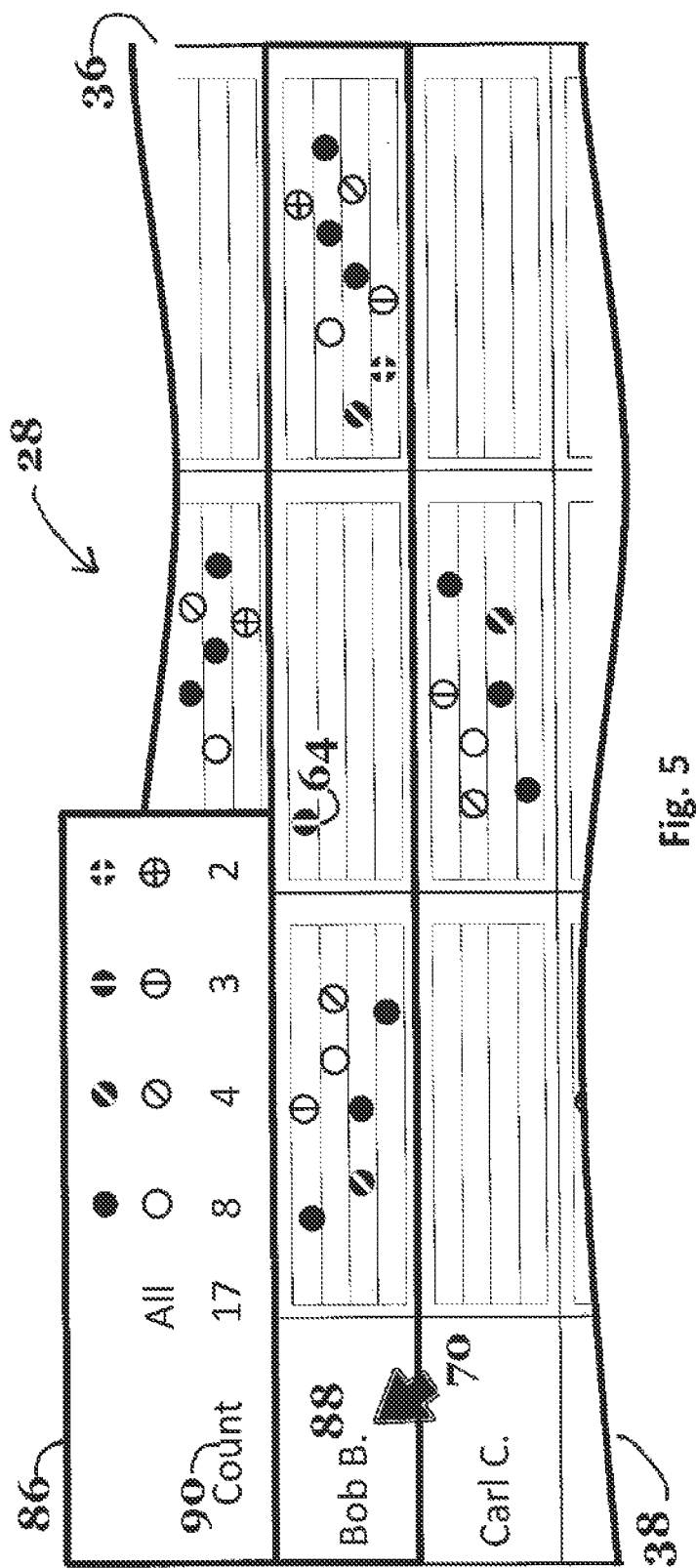

FIG. 5 illustrates another form of interaction between the user and the data-visualization interface 28. In the embodiment pictured in FIG. 5, the data-visualization interface 28 responds to a cursor 70 hovering over a label 88 corresponding to a value in context dimensions 38 by creating a summary display 86. The illustrated summary display 86 includes the statistics 90 regarding the color of the data markers 64 that are co-linear along the context dimensions 38 with the label 88. In the data-visualization interface 28 of FIG. 5, the co-linear sub-displays 34 are in a row. The illustrated statistics 90 are counts for each data marker color and may be stored as cache data or may be calculated in response to user interaction. Again, other statistics than counts, such as those discussed above with reference to summary display 74 of FIG. 3 are contemplated. The data-visualization interface 28 may create a similar summary display in response to the cursor 70 hovering over any label in dimension 38.

Figure 6:
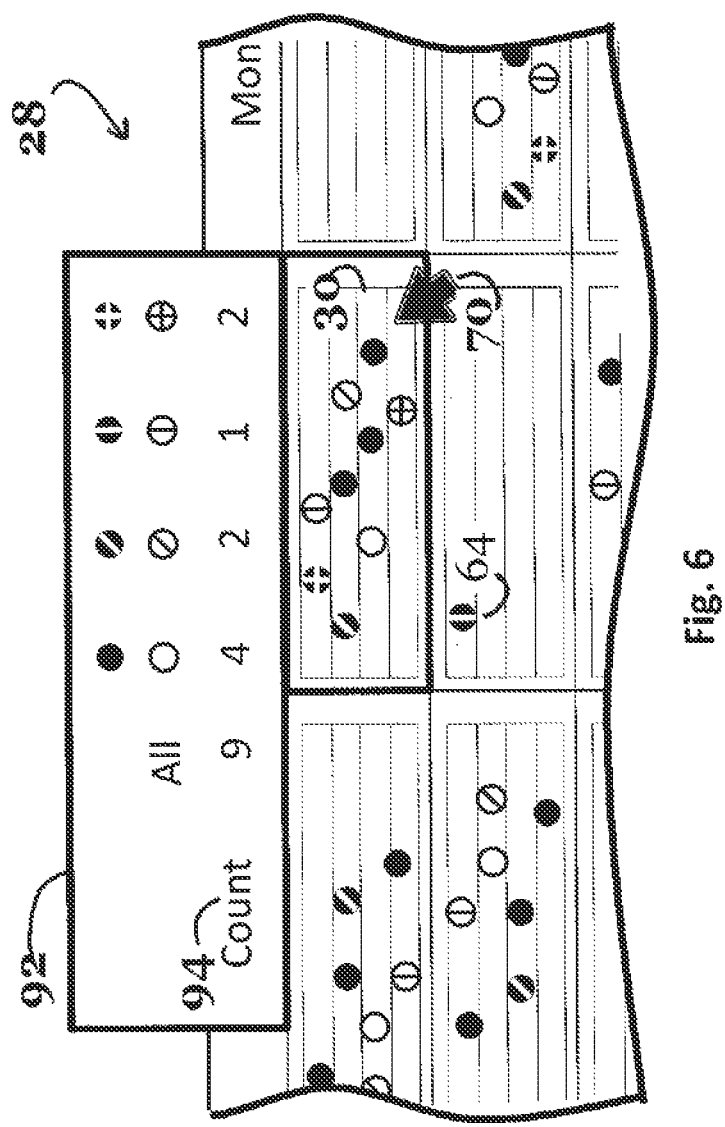

FIG. 6 illustrates another form of interaction between the user and the data-visualization interface 28. FIG. 6 illustrates the response of the data-visualization interface 28 to a user hovering the cursor 70 over a sub-display 30. In the pictured interaction of the present embodiment, a summary display 92 containing statistics 94 about the sub-display 30 over which the cursor 70 is hovering is created. The statistics 94 include counts for each color of data marker 64 within sub-display 30. And as with the previously described sub-displays, the statistics 94 may be stored in cache data or may be calculated in response to the cursor 70 hovering over sub-display 30, e.g., according to instructions in JavaScript transmitted with the visualization file 28 encoding the data-visualization interface 28. Further, the statistics 94 may include any of the previously discussed statistics described in reference to summary display 74 of FIG. 3. The data-visualization interface 28 may create a similar summary display 92 in response to the cursor 70 hovering over any of the sub-displays 30.

In summary, FIGS. 3 through 6 illustrate exemplary interactions with the data-visualization interface 28 that reveal aggregate statistics about portions or all of the information pictured in data-visualization interface 28. For example, FIG. 3 illustrates an example of interaction in the present embodiment that reveals statistics about the data depicted in the entire data-visualization interface 28, and FIGS. 4 and 5 illustrates examples of interaction in the present embodiment that reveal statistics about the data depicted in an entire column or row, respectively, in data-visualization interface 28. Finally, FIG. 6 illustrates an example of interaction in the present embodiment that reveals statistics about the data depicted in a single sub-display 30. In each of these examples, the interaction reveals an aggregation of depicted data, for example the total count of data markers in a column. In the previously described examples, each of the interactions was triggered by a user hovering a cursor 70 over a feature of the data-visualization interface 28. In other embodiments, the data-visualization interface 28 may have a touch-screen interface, for example a multi-touch interface, and the above mentioned, and subsequently described, interactions may be triggered by touching regions of the data-visualization interface 28. In addition to presenting summary statistics, the data-visualization interface 28 may also interact with a user to display additional data related to the depicted data, as described below with reference to FIGS. 7-10.

Figure 7:
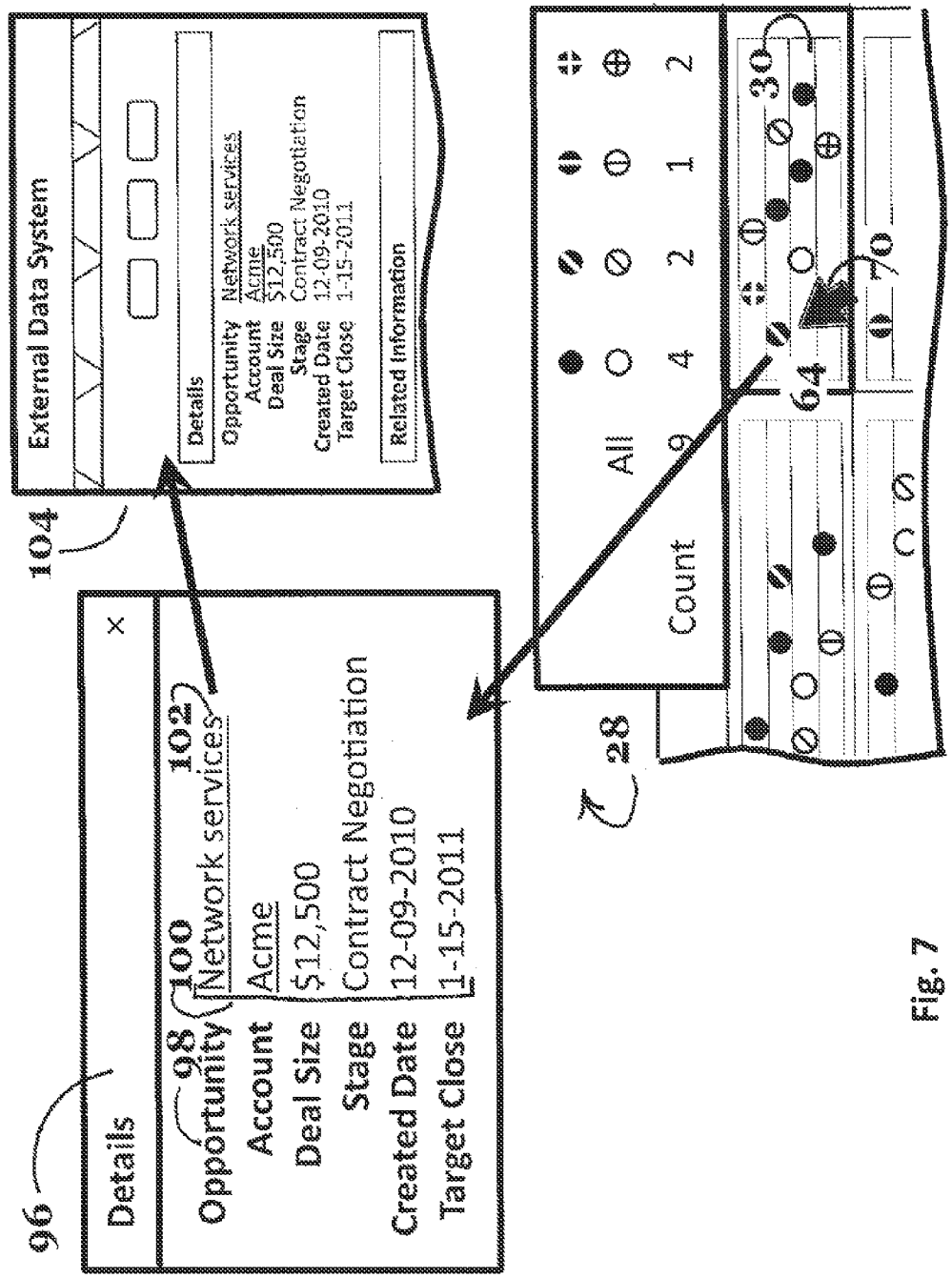

FIG. 7 illustrates an example of a response of the present embodiment of a data-visualization interface 28 to a user selecting a data marker 64, for example by clicking on the data marker 64 with the cursor 70 or touching the data marker 64. As illustrated by FIG. 7, in this embodiment, the data-visualization interface 28 creates a detailed display 96 in response to a user selecting the data marker 64. The detailed display 96 may include fields 98 and corresponding data 100 that reveals more detail than can be discerned from the data marker 64 in sub-display 30. In some embodiments, the fields 98 and data 100 are stored as cache data on the receiving device 18, 20, or 22. Storing the fields 98 and data 100 as cache data is believed to facilitate a faster response of the data-visualization interface 28 to a user interaction selecting the data marker 64 relative to systems in which the fields 98 and data 100 are retrieved from a remote data source. In some embodiments, each of the data markers 64 may be linked to similar fields and data 100 stored as cache data associated with the data-visualization interface 28. Thus, in some user interactions, some, substantially all, or all of the cache data is not presented to a user, depending on which, if any, data marker 64 is selected. However, transmitting the cache data with the data-visualization interface 28 is believed to facilitate relatively fast responses of the data-visualization interface 28 to the user interactions relative to systems that require a subsequent round trip request for the additional data implicated by a user interaction. (However, the present technique is not limited to systems that use cache data.) Some of the data 100 may include the values mapped to the position of the data markers 64 within the sub-displays 30 or values mapped to other attributes of the data markers 64 or the sub-displays 30, e.g., color or shape. Some data values 102 may include links to additional information presented in a detailed report 104 of information associated with the selected data marker 64.

Figure 8:
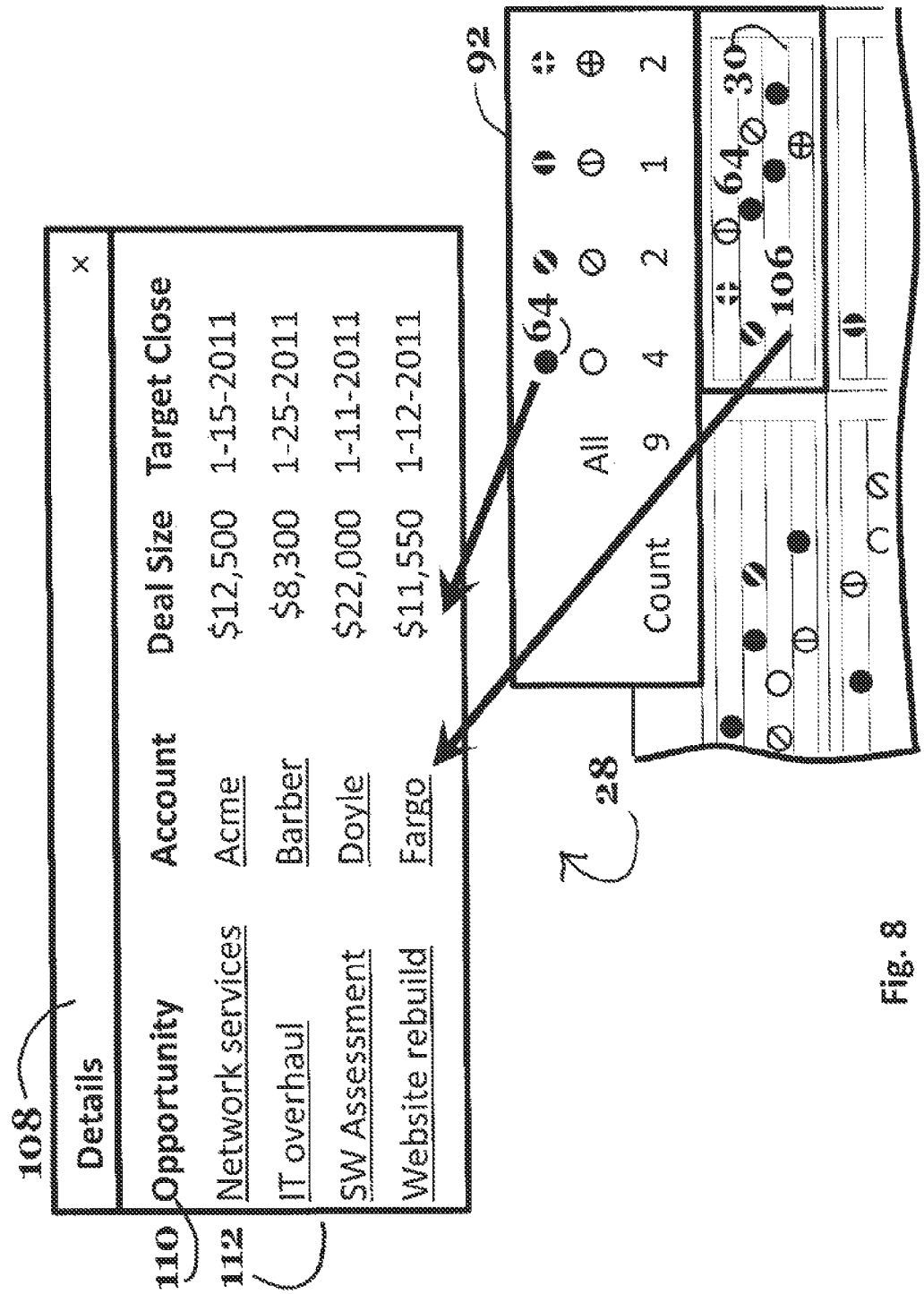

FIG. 8 illustrates another example of an interaction of a user and the data-visualization interface 28. In the example of FIG. 8 of the presently described embodiment, a user interacts with the data-visualization interface 28 by selecting, for example, clicking or touching, a background field 106 the sub-display 30. The background field 106 is a region of the sub-display 30 not occupied by a data marker 64. In response to the user selecting the background field 106 of sub-display 30, the data-visualization interface 28 creates a detailed display 108 containing fields 110 and data 112 for each data marker 64 in the sub-display 30. In some embodiments, the fields 110 and a data 112 are stored as cache data, thereby potentially lowering the response time of the data-visualization interface 28 to a user interaction. In the illustrated embodiment, the detailed display 108 is also accessible through a summary display 92 by selecting data markers 64.

Figure 9:
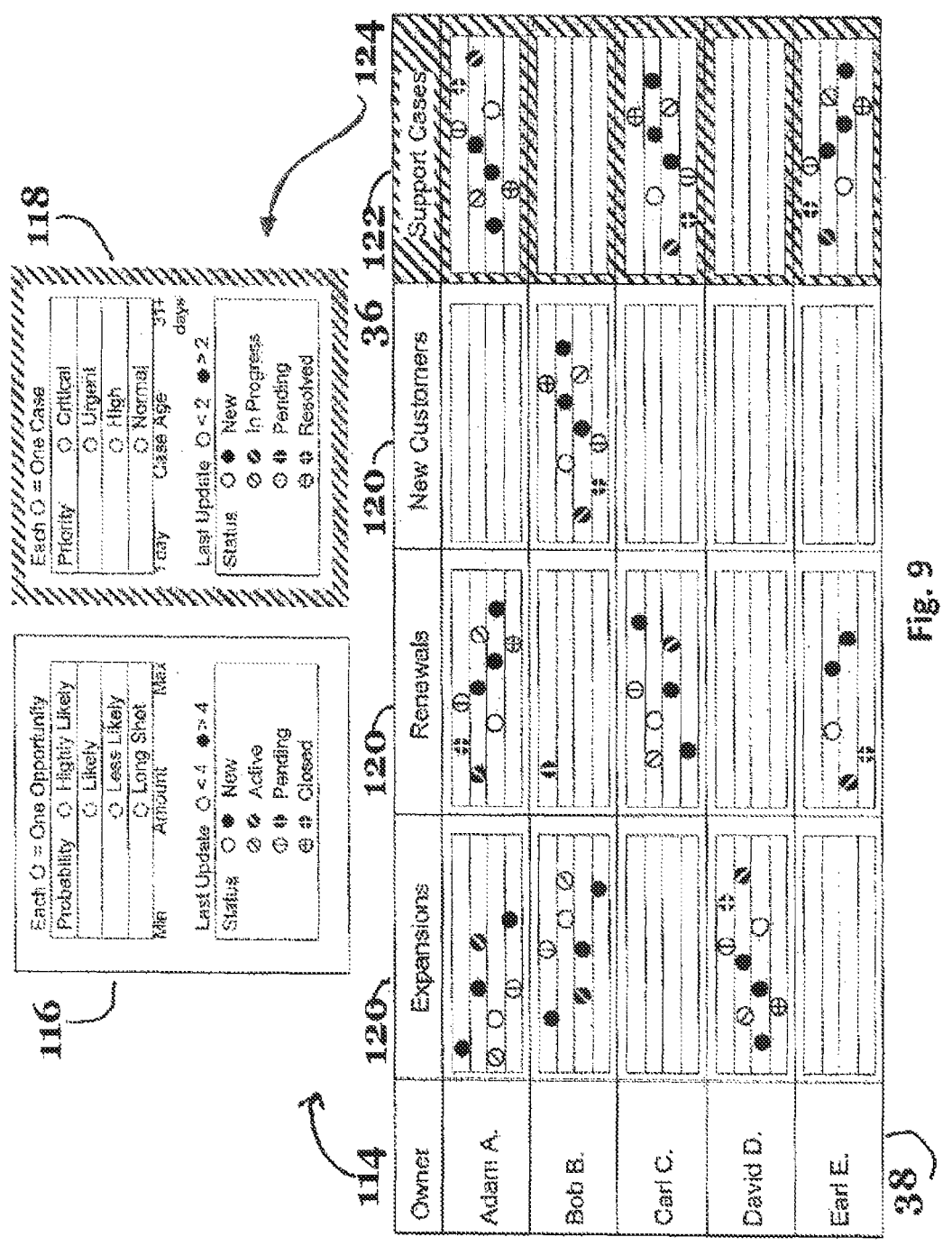

FIG. 9 illustrates another embodiment of a data-visualization interface 114 that is similar to the data-visualization interface 28 of FIGS. 2-8 except that the data-visualization interface 114 includes multiple legends 116 and 118. Legend 118 corresponds to sub-displays 30 in a collection of columns 120, and legend 116 corresponds to sub-displays in column 122. Consequently, in the data-visualization interface 114, there are three context dimensions: the context dimension 38 to which the sales representative identifier is mapped, the context dimension 36 to which a transaction category is mapped, and the context dimension 124 to which the categories of opportunity age and decay stage are mapped, as indicated by legends 116 and 118. Other embodiments may include additional legends 116 and 118 that increase the resolution of context dimensions 124.

FIG. 10 illustrates another example of a data-visualization interface 126 that is embedded within a webpage 128. The webpage 128 may be formed in the receiving device 118 shown in FIG. 1. In some embodiments, the receiving device 118 may respond to a request for a webpage 128 by requesting data-visualization interface 126 from visualization server 12 and then embedding the resulting visualization file within the webpage 128 before transmitting the webpage 128 to a requesting user, such as a user operating a downstream device connected to the receiving device 118 via the Internet.

Figure 11:
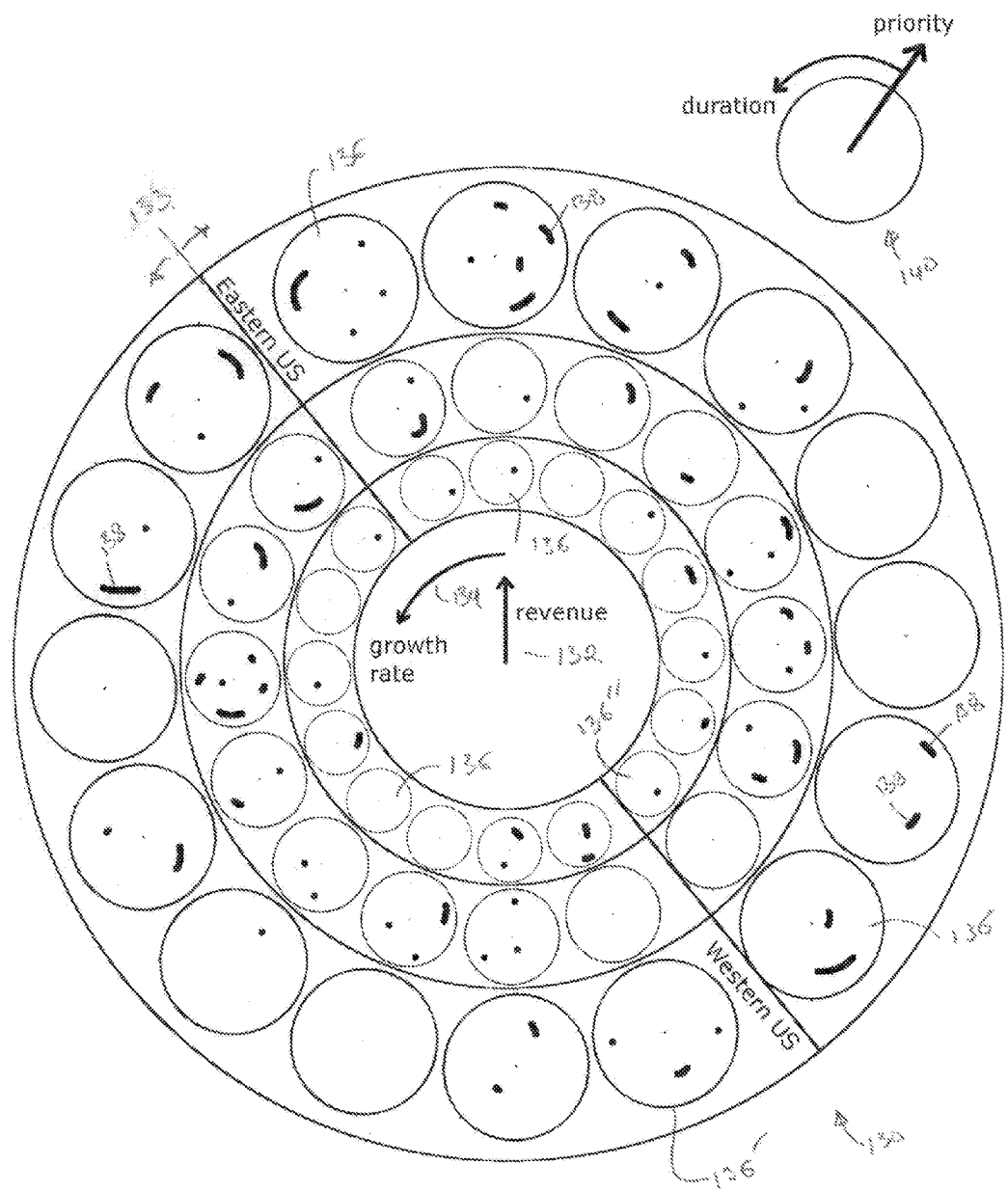
FIG. 11 illustrates another example of a data visualization interface.

FIG. 11 illustrates another example of a data-visualization interface 130. The data-visualization interface 130 includes context dimensions 132, 133, and 134 that are polar coordinates and a plurality of sub-displays 136 positioned according to their corresponding context dimensions 132, 133 and 134. As illustrated, in this embodiment, context dimension 132, which is mapped to the radius position of each sub-display 136 of the data-visualization interface 130, corresponds to revenue. Context dimension 133, which divides the angular position of each sub-display 136 within the data-visualization interface 130, is mapped to the region relevant to each sub-display 136, which in the illustrated example is the Eastern US or the Western US. Context dimension 134, which corresponds to the angular position of each sub-display 136 within the divisions indicated by context dimensions 133, is mapped to the growth rate relevant to each sub-display 136. Thus for example, the sub-display 136' corresponds to the highest growth rate and most revenue within the Western United States, and sub-display 136" corresponds to the lowest growth rate and least revenue within the Eastern United States.

Sub-displays 136 may include data markers 138 that are mapped to additional dimensions as shown by a legend 140 of the data-visualization interface 130. Thus, in the illustrated embodiment, the radius of the position of the data markers 138 within the sub-displays is mapped to a priority designation and the angular position of the data markers 138 within the sub-displays 136 is mapped to the duration designation. In this embodiment, the data visualization 130 may be transmitted with cached data that is accessible by selecting designations for data markers 138, sub-displays 136, or context dimensions 132, 133, and 134.

Figure 12:
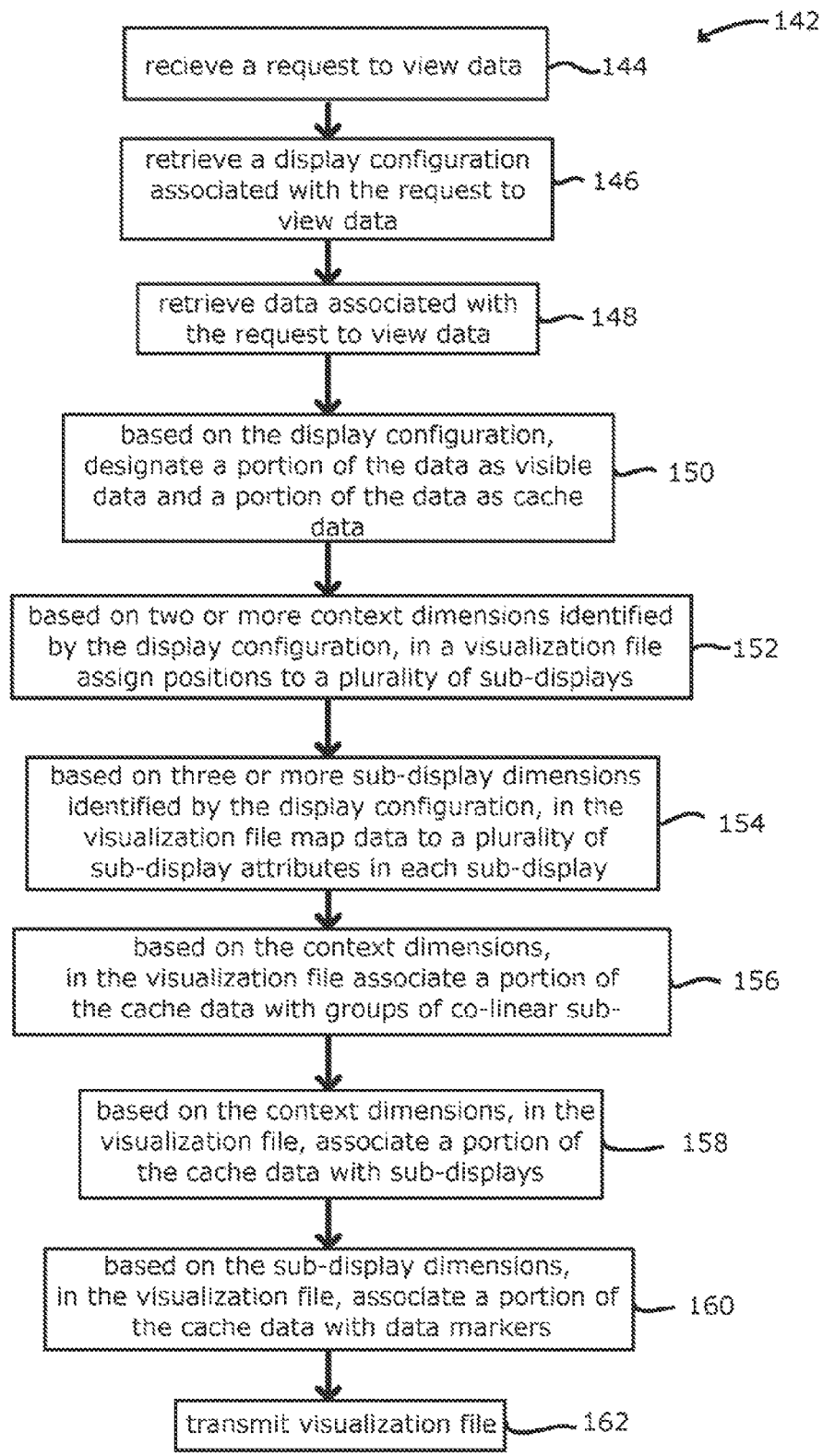
FIG. 12 illustrates an example of a method for forming a data-visualization interface with cache data.

FIG. 12 illustrates an example of a process 142 for forming a data-visualization interface with cache data. The process 142 includes receiving a request to view data, as indicated by block 144, and retrieving a display configuration associated with the requested view data, as indicated by block 146. The display configuration may be stored in a tangible machine-readable medium on the visualization server 12 of FIG. 1, for example. In some embodiments, the display configuration may indicate which data fields are mapped to which attributes of a data visualization. For example, the display configuration may indicate that a salesperson identification corresponds to a context dimension mapped to a vertical position attribute of sub-displays 30, such as dimension 38 of FIG. 2, and that a designation identifying how many months have elapsed corresponds to a context dimensions mapped to a horizontal position attribute of sub-displays 30, such as dimension 36 of FIG. 2. Similarly, the display configuration may also indicate which fields are mapped to which attributes or a sub-display, such as horizontal and vertical position of a data marker, data marker color, data marker shape, etc. The display configuration may also specify which data in fields to retrieve as cache data for use in interaction between a data-visualization interface and the user.

Next, the data associated with the request to the data is retrieved, as indicated by block 148, and based on the display configuration, a portion of the retrieved data is designated as visible data and a portion is designated as cache data, as indicated by block 150. Based on two or more context dimensions identified by the display configuration, in a visualization file, positions are assigned to a plurality of sub-displays, as indicated by block 152. Assigning positions may include forming an rectangular matrix of sub-displays, such as illustrated in FIG. 2.

Next, based on three or more sub-display dimensions identified by the display configuration, in the visualization file, data may be mapped to a plurality of the sub-display attributes in each sub-display, as indicated by block 154. Mapping may include assigning colors, shapes, and positions to data markers, such as those shown in FIG. 2.

The process 142 may also include a step of associating a portion of the cached data with groups of co-linear sub-displays based on context dimensions, as illustrated by block 156, and as is shown in FIGS. 4 and 5, for example. Additionally, based on the context dimensions, a portion of the cached data in the visualization file may be associated with sub-displays, as indicated by block 158, and as is shown in FIGS. 6 and 8, for example. Associating cache data with sub-displays or other features may include automatically generating JavaScript code in the visualization server 12 for inclusion in a visualization file that, when executed, presents summary displays or detailed displays based on the cache data in response to user interactions at a receiving device. The process 142 further includes associating a portion of the cached data with data markers in the sub-displays based on sub-display dimensions, in the visualization file, as shown, for example in FIG. 7. Finally, the process 142 includes transmitting the visualization file to a receiving device, as illustrated by block 162. The transmitted visualization file may be stored on a tangible, machine readable media on the receiving device and when executed, cause the receiving device to display and perform the interactions of the data-visualization interfaces of FIGS. 2-11.

Figure 13:
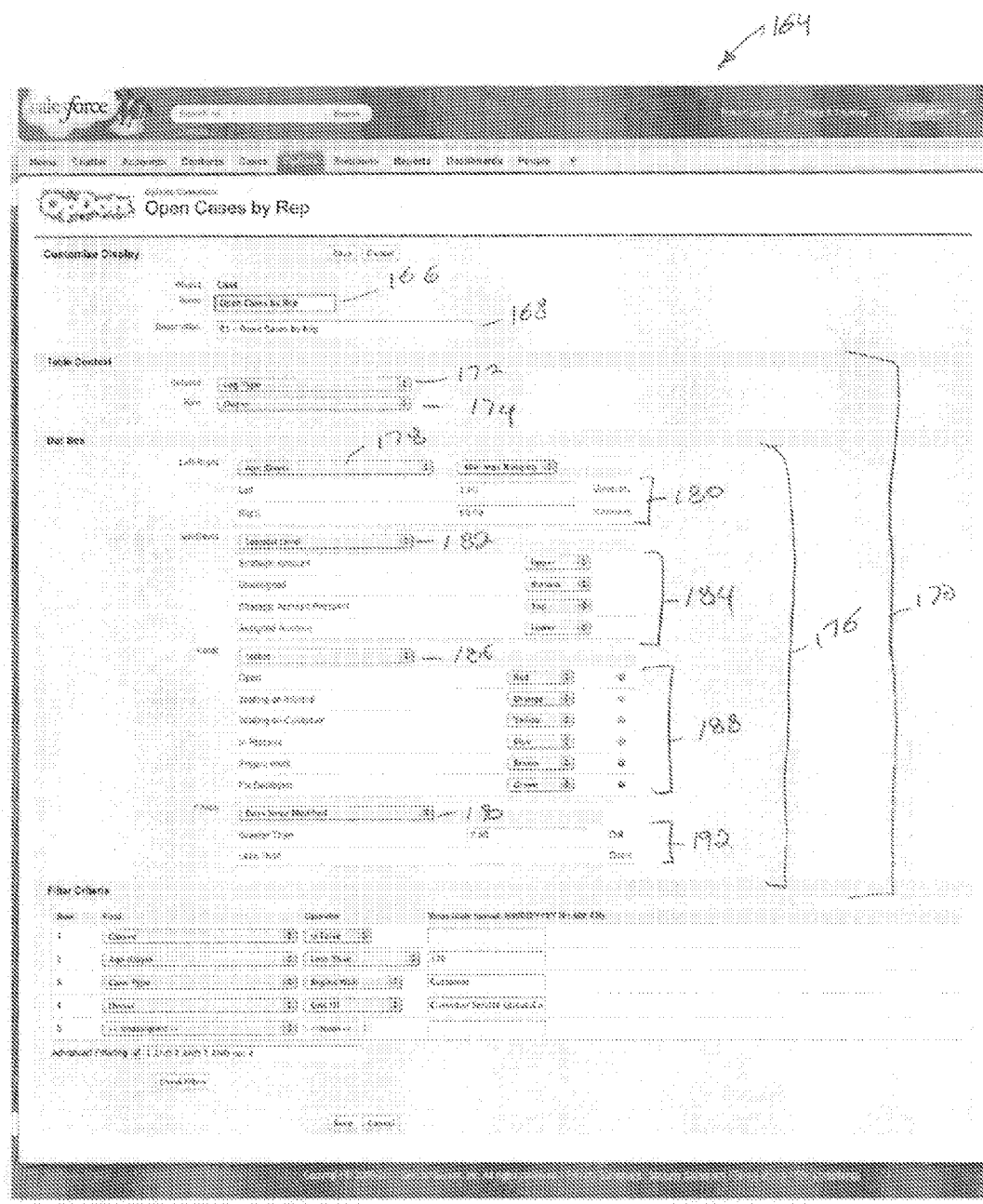
FIG. 13 illustrates an example of a visualization configuration interface.

FIG. 13 illustrates an example of a visualization-configuration interface 164. The visualization-configuration interface 164 may be formed by the visualization server 12 illustrated in FIG. 1 based on data residing in the data source 14 also shown in FIG. 1, as described further below. In some embodiments, the visualization-configuration interface 164 may be populated with menu options by the visualization server 12 that facilitate the design of a data-visualization interface, such as the data data-visualization interfaces of FIGS. 2-11. In particular, in some embodiments, the menu options may group data fields having a relatively high cardinality as menu options for data visualization attributes having a relatively high resolution and group data fields having a relatively low cardinality as menu options for data visualization attributes having a relatively low resolution. A process for populating menu options of the visualization-configuration interface 164 is described below with reference to FIG. 14, after describing aspects of the visualization-configuration interface 164. Populating configuration menu options based on cardinality and resolution is believed to facilitate the configuration of data-visualization interfaces by users who are not otherwise trained to configure data visualizations, who have received relatively little training in such tasks, or who are not familiar with the data source supplying the data being visualized.

The visualization-configuration interface 164 may be a webpage form, transmitted as a configuration-interface file, constructed with HTML, JavaScript, and associated image files. The illustrated visualization-configuration interface 164 includes fields 166 and 168 for naming and describing a data-visualization interface and a group of dimension-configuration fields 170 for mapping data fields to attributes of the data-visualization interface, such as context dimensions, and aspects of the sub-displays, e.g., data marker shape, color, position, etc. In some embodiments, the visualization-configuration interface 164 may present a list of menu options for dimension-configuration fields 170 when an individual field is selected, e.g., as a drop-down box of data field menu options among which a user may select. The process for populating menu options by the visualization-configuration interface 164 described below with reference to FIG. 14 may be applied to the fields 170. In the illustrated embodiment, the dimension-configuration fields 170 may include context-dimensions fields 172 and 174 for row and column context dimensions, respectively. The illustrated visualization-configuration interface 164 may also include fields 176 for mapping data to attributes of the sub-displays. Fields 176 may include a field 178 for indicating which data is mapped to the horizontal axis of a sub-display and fields 184 indicating the minimum and maximum of the horizontal axis of the sub-display. Similarly, fields 176 may include a field 182 for mapping data to the vertical axis of the sub-displays and fields 184 for assigning discrete categories of data values to those vertical axis positions. Additionally, fields 176 may include field 186 for mapping data values to the color of data markers and fields 188 for assigning specific colors to specific data value categories. Finally, in the present embodiment, fields 176 may include a field 190 that maps a data value to a shape of the data marker and fields 192 for identifying one or more threshold values at which the shape of the data marker is changed.

The dimension-configuration fields 170 map data to visualization attributes having differing resolutions, or variety of visually distinguishable attribute states. For example, with reference to FIG. 2, the horizontal axis of a sub-display (mapped in FIG. 2 to amount 56) is a relatively high-resolution attribute because a data marker can assume a relatively high number of different positions along the horizontal axis. In contrast, the context dimension 36 in FIG. 2 is a relatively low resolution attribute because the context dimension 36 only encompasses three values in the illustrated embodiment. Similarly, the other attributes in the embodiment of FIG. 2 have other resolutions. For example, the context dimension 38 in the embodiment of FIG. 2 has a resolution that displays 14 different values, and the shape attribute 62 of the data markers 64 has a resolution that reflects two different values in the embodiment of FIG. 2. As used herein, the term "attribute" refers to a feature of a data visualization to which the data being visualized is mapped, and the term "resolution" refers to the number of different states and attribute can assume. Thus, in the example of FIG. 2, the attribute of data marker color has a resolution of six, and the attribute of data marker shape has a resolution of two.

Figure 14:
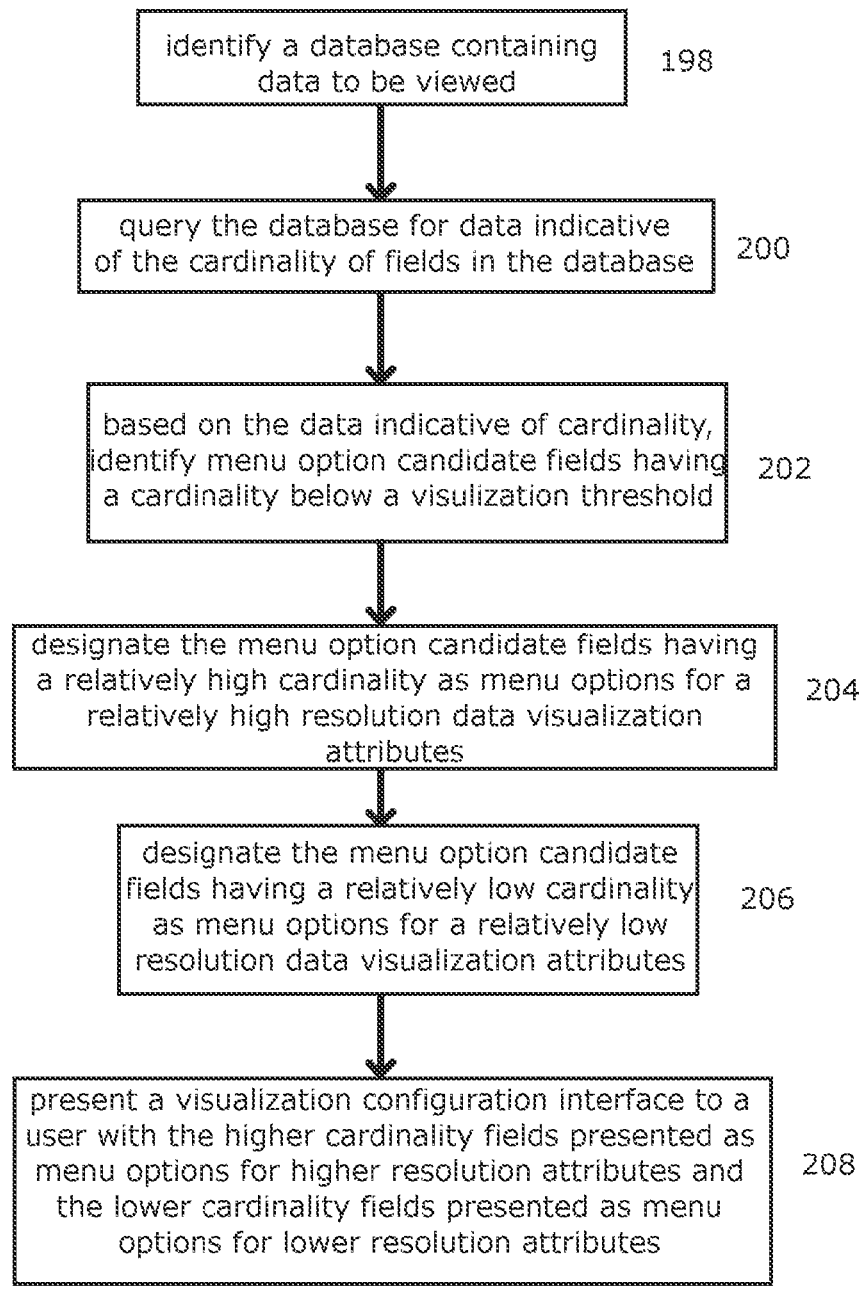
FIG. 14 illustrates an example of a method for populating menu options in the visualization-configuration interface of FIG. 13.

FIG. 14 illustrates an example of a process 196 for identifying fields and a data source well-suited to an attribute in a data-visualization interface. A field in a data source is said to be well-suited for an attribute in a data-visualization interface if the cardinality of that field corresponds to the resolution of the attribute relative to the other fields in the data source and other attributes in the data visualization. That is, the process 196, in some embodiments, facilitates the configuration of data-visualization interfaces by suggesting to a user matches of relatively high cardinality fields with relatively high-resolution attributes in a data visualization and relatively low cardinality fields with relatively low resolution attributes in the data visualization. Further, the process 196 may avoid presenting menu options of data fields that are not suitable for representation as a data-visualization attribute, e.g., a field in which narrative descriptions are stored and for which the data is not readily represented as a visualization attribute in a meaningful form.

In this embodiment, the process 196 begins with identifying a database containing data to be viewed, as indicated by block 198. Identifying the database may include correlating a user account with a database to which that user has access, or may include presenting a list of databases to which a user has access to a user and receiving a selection by the user of a database from among the list. In some embodiments, multiple databases may be identified.

Next, the identified database is queried for data indicative of the cardinality of fields (e.g., columns) of data in the database, as indicated by block 200. Querying the database may include querying the database for a list of tables within the database, a list of fields within each table, a list of data types associated with each field (for example integer, string, Boolean, date, etc.), a list of data values for a field, a maximum and a minimum value for a field, a number of characters in a field, or querying a cardinality of a field.

The process 196 further includes identifying menu option candidate fields having a cardinality below a visualization threshold, as indicated by block 202. Identifying fields having a cardinality below a visualization threshold may include eliminating from consideration as menu options high cardinality fields, such as fields with long strings of text including a narrative description or large number of residential addresses. Such high cardinality fields may be identified based on a cardinality value itself, based on a description of the field including a keyword such as comments or narrative, or the field having a string data type and a character limit above some threshold, for example above 100 characters. The visualization threshold may be selected based on the highest resolution attribute within a data-visualization interface, e.g., the visualization threshold may be multiple of, a fraction of, or approximately equal to the resolution of the highest resolution attribute. Thus, in some embodiments, the fields having a cardinality above the visualization threshold may be filtered out of the candidate fields for menu options, or in some embodiments.

The process 196 also includes designating menu option candidate fields identified in step 196 having a relatively high cardinality as menu options for a relatively high resolution data visualization attributes, as indicated by block number 204. Designating the identified fields having a relatively high cardinality may include identifying fields having a cardinality above some threshold or identifying fields based on their position within a distribution of cardinalities, for example the highest 50% of cardinality fields. In certain embodiments, the identified fields may also be ranked for listing in order or reverse order of cardinality as menu options. In some embodiments, the visualization server 12 may designate fields by populating menu options of high-resolution attributes in a visualization configuration interface, such as options for the attribute 178 in the interface of FIG. 13.

The process 196 further includes designating the menu option candidate fields having a relatively low cardinality as menu options for a relatively low resolution data visualization attributes, as indicated by block number 206. Designating the identified fields having a relatively low cardinality may include identifying fields having a cardinality below some threshold or identifying fields based on their position within a distribution of cardinality, for example the lowest 50% of cardinality fields. In some embodiments, the low cardinality menu options may be created from higher cardinality fields by quantizing the data within that field, for example grouping date entries by month or rounding integer values to the nearest 100. Low cardinality fields may be identified based on data type, e.g., fields having a Boolean data type, or low cardinality fields may be identified by querying the database for all values in a field and counting the number of unique values. For instance, a part number field in a database may have a relatively high number of characters, but relatively few unique part numbers may occur, causing the field to have a low cardinality. Again, in certain embodiments, the identified fields may also be ranked for listing in order or reverse order of cardinality as menu options. In some embodiments, the visualization server 12 may designate fields by populating menu options of low-resolution attributes in a visualization configuration interface, such as options for the attribute 174 in the interface of FIG. 13. The visualization server 12 may populate menu options in the visualization configuration interface such that the cardinality of fields is used to rank the order in which the options appear and such that, in some embodiments, only fields having a cardinality equal to or below an attributes resolution are presented as menu options for that attribute.

In some embodiments, cardinality may be calculated subject to other constraints on the data. For instance, cardinality of fields may be calculated based only on data acquired within some time period, e.g., within the last three months preceding a query.

Finally, a visualization configuration interface may be presented to a user with the higher cardinality fields presented as menu options for higher resolution attributes and the lower cardinality fields presented as menu options for lower resolution attributes, as indicated by block 208. In some embodiments, some fields may be presented as menu options for data visualization attributes spanning a range of resolutions, e.g., a date field may be presented as an option for both the vertical axis of a sub-display and as an option for a horizontal context dimension.

Presenting a visualization configuration interface may include automatically constructing HTML and JavaScript configured to form the web page of FIG. 13, transmitting the file to a user, receiving selections from the user, and forming a visualization configuration file based on the selections. Thus, in the visualization-configuration interface of FIG. 13, the menu options presented based on cardinality may be presented in drop down boxes from which a user can choose to map a data field to a data visualization attribute. That is, the process 196 of FIG. 14 may be used to populate menu options in the web page form 164 of FIG. 13.

In summary, the process 196 is believed to facilitate the configuration of data visualizations. By presenting menu options drawn from the fields presently available in a data source, in some embodiments, the user is able to configure a data visualization without themselves querying the database to determine which fields are available. And by limiting menu options based on the cardinality of the fields and the resolution of an attribute to which the menu option applies, in some embodiments, a user is able to map data to data visualization attributes more easily than in systems in which the user maps data fields to attributes without guidance.

Figure 15:
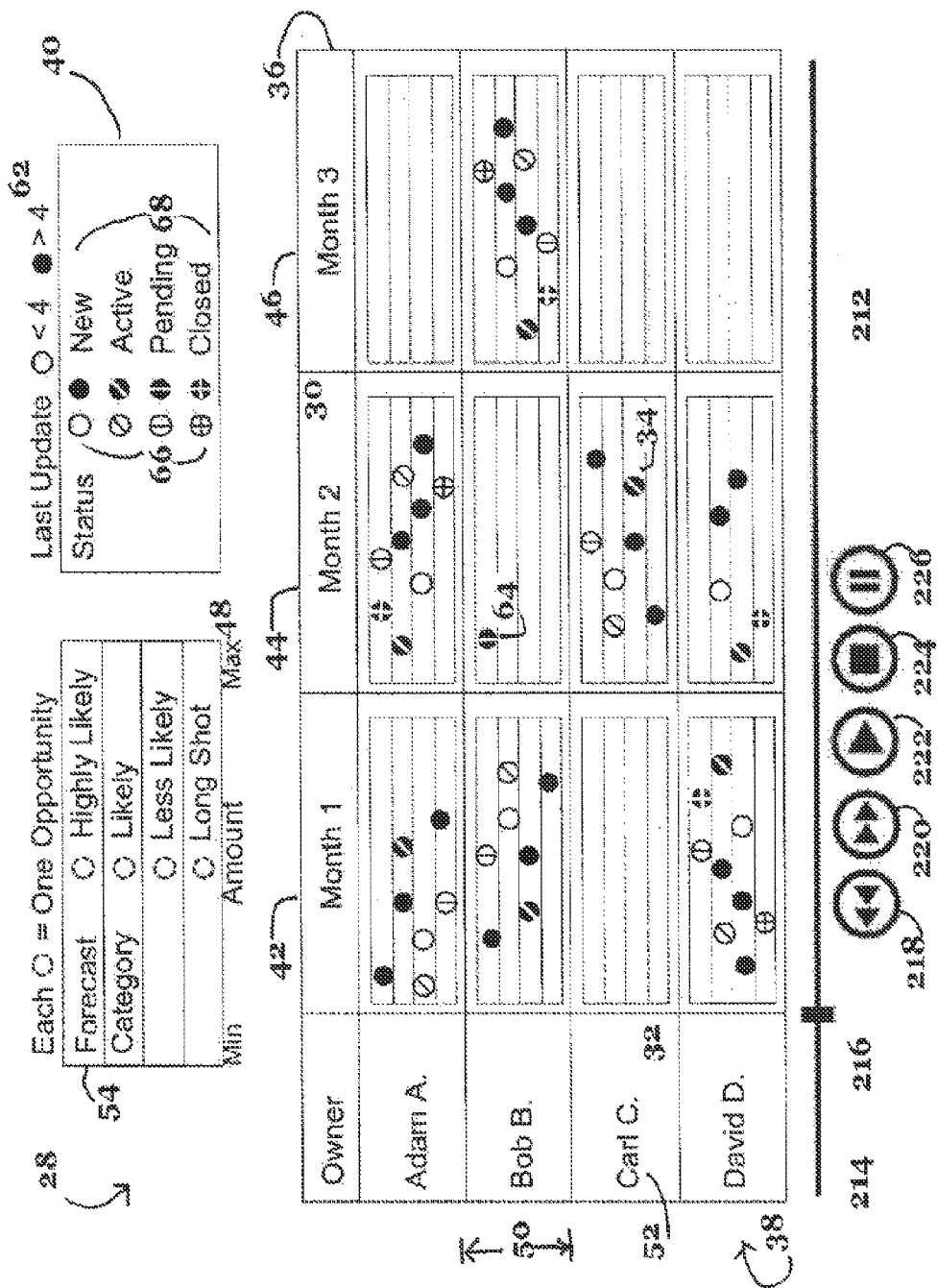
FIG. 15 illustrates another example of a data-visualization interface with an additional temporal context dimension.

FIG. 15 illustrates another example of a data-visualization interface 210 having an additional temporal context dimension 212. In the illustrated example, the context dimension 212 is mapped to time, though in other embodiments, other data may be mapped to the context dimension 212, e.g., priority. In the illustrated embodiment, a user views the state of data-visualization interface 212 at a given value of context dimensions 212, e.g., a state at a given point in time, by using a variety of controls, including a time-line 214, a slider 216, a rewind button 218, a fast forward button 220, a play button 222, a stop button 224, and a pause button 226. The state of the data-visualization interface 210 at each increment of context dimension 212, e.g., each increment of time, such as an hour, or day, can, in some embodiments, be viewed by a user by either moving the slider 216 along the time-line 214 or selecting the buttons 218-226. In some embodiments, the states of the data-visualization interface 210 for each increment of context dimension 212 represented along time-line 214 may be stored in cache-data in the manner described above. The user may view an animation of the data-visualization interface 210 evolving over time, or along some other changing parameter, by interacting with the controls 214-226 of the context dimension 212. In the illustrated embodiment, the context dimension 212 is a relatively high resolution attribute, as the illustrated time-line 214 includes a relatively high number of increments, e.g., more than 20, more than 50, or more than 200.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of initializing a data visualization configuration interface, the method comprising:
obtaining identification data identifying a database containing data to be viewed, the database defining a plurality of database fields;
querying the database for data indicative of the cardinality of the database fields;
identifying menu option fields based on the cardinality of the database fields;
pairing, with a processor, in a visualization configuration interface, menu option fields with data visualization attributes based on the cardinality of the database fields and a resolution of each of the data visualization attributes;
transmitting the visualization configuration interface to a user;
receiving from the user configuration data indicative of a configuration of a data visualization; and
transmitting to the user or another user a data visualization based on the received configuration data and data in the database, wherein transmitting to the user or another user a data visualization based on the received configuration data and data in the database comprises:
receiving a plurality of requests for data visualizations over time from a plurality of different users; and
in response to each request, transmitting a data visualization based on the configuration data to the respective user from which the request was received, wherein the data visualization comprises a plurality of sub-displays arranged in an array, each sub-display including an X and Y axis and one or more data markers having a position, color, and shape selected based on values in the database.

2. The method of claim 1, wherein the data visualization attributes include a abscissa and an ordinate of a graph, and wherein the abscissa and ordinate are paired with database fields based on both the cardinality of the database fields and the aspect ratio of the graph, such that the longer of the abscissa and the ordinate is paired with a higher cardinality database filed than the shorter of the abscissa and the ordinate.

3. The method of claim 1, wherein the data visualization attributes include a shape of a data point marker and a coordinate of a position of the data point marker in a graph, and wherein the shape is paired with a lower-cardinality database field than the coordinate.

4. The method of claim 3, wherein the data visualization attributes include attributes of a shadow of a data point marker, and wherein the shadow is paired with a lower-cardinality database field than the coordinate.

5. The method of claim 1, wherein identifying menu option fields based on the cardinality of the database fields comprises:
determining that a database field has a cardinality below a visualization threshold for a menu option.

6. A tangible, machine-readable, non-transitory medium storing instructions that when executed by a data processing apparatus effectuate operations, comprising:

obtaining identification data identifying a database containing data to be viewed, the database defining a plurality of database fields;

querying the database for data indicative of the cardinality of the database fields;

identifying menu option fields based on the cardinality of the database fields;

pairing, with a processor, in a visualization configuration interface, menu option fields with data visualization attributes based on the cardinality of the database fields and a resolution of each of the data visualization attributes;

transmitting the visualization configuration interface to a user;

receiving from the user configuration data indicative of a configuration of a data visualization; and transmitting to the user or another user a data visualization based on the received configuration data and data in the database, wherein transmitting to the user or another user a data visualization based on the received configuration data and data in the database comprises:

receiving a plurality of requests for data visualizations over time from a plurality of different users; and in response to each request, transmitting a data visualization based on the configuration data to the respective user from which the request was received, wherein the data visualization comprises a plurality of sub-displays arranged in an array, each sub-display including an X and Y axis and one or more data markers having a position, color, and shape selected based on values in the database.

7. A system, comprising:

one or more processors; and memory storing instructions that when executed by at least some of the one or more processors effectuate operations comprising:

obtaining identification data identifying a database containing data to be viewed, the database defining a plurality of database fields;

querying the database for data indicative of the cardinality of the database fields;

identifying menu option fields based on the cardinality of the database fields;

pairing, in a visualization configuration interface, menu option fields with data visualization attributes based on the cardinality of the database fields and a resolution of each of the data visualization attributes;

transmitting the visualization configuration interface to a user;

receiving from the user configuration data indicative of a configuration of a data visualization; and transmitting to the user or another user a data visualization based on the received configuration data and data in the database, wherein transmitting to the user or another user a data visualization based on the received configuration data and data in the database comprises:

receiving a plurality of requests for data visualizations over time from a plurality of different users; and in response to each request, transmitting a data visualization based on the configuration data to the respective user from which the request was received, wherein the data visualization comprises a plurality of sub-displays arranged in an array, each sub-display including an X and Y axis and one or more data markers having a position, color, and shape selected based on values in the database.

8. The system of claim 7, wherein the data visualization attributes include a abscissa and an ordinate of a graph, and wherein the abscissa and ordinate are paired with database fields based on both the cardinality of the database fields and the aspect ratio of the graph, such that the longer of the abscissa and the ordinate is paired with a higher cardinality database filed than the shorter of the abscissa and the ordinate.

9. The system of claim 7, wherein the data visualization attributes include a shape of a data point marker and a coordinate of a position of the data point marker in a graph, and wherein the shape is paired with a lower-cardinality database field than the coordinate.

10. The system of claim 9, wherein the data visualization attributes include attributes of a shadow of a data point marker, and wherein the shadow is paired with a lower-cardinality database field than the coordinate.

11. The system of claim 7, wherein identifying menu option fields based on the cardinality of the database fields comprises:

determining that a database field has a cardinality below a visualization threshold for a menu option.

\* \* \* \* \*